United States Patent
Hiremath (10) Patent No.: US 10,700,818 B2
(45) Date of Patent: Jun. 30, 2020

(54) SYSTEM AND METHOD FOR IMPROVING EFFICIENCY OF WIRELESSLY TRANSMITTING VIDEO PACKETS

(71) Applicant: GainSpan Corporation, San Jose, CA (US)

(72) Inventor: Indudharswamy G. Hiremath, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 60 days.

(21) Appl. No.: 15/991,799

(22) Filed: May 29, 2018

(65) Prior Publication Data

US 2019/0268102 A1    Aug. 29, 2019

(30) Foreign Application Priority Data

Feb. 26, 2018  (IN) .............................. 201841007160

(51) Int. Cl.
*G08C 25/02*    (2006.01)
*H04L 1/18*    (2006.01)
(Continued)

(52) U.S. Cl.
CPC ...... *H04L 1/1809* (2013.01); *H04L 29/06523* (2013.01); *H04L 65/00* (2013.01); *H04N 21/43637* (2013.01); *H04W 84/12* (2013.01)

(58) Field of Classification Search
CPC . H04L 1/1809; H04L 29/06523; H04L 65/00; H04L 65/602; H04L 1/1854; H04L 1/1877; H04L 1/1887; H04L 29/06462; H04L 65/80; H04L 29/06027; H04L 65/607; H04L 47/10; H04L 47/193; H04L 47/2416; H04L 47/37; H04L 47/27; H04L 47/14; H04L 69/16; H04L 12/4015; H04L 12/413; H04L 1/1642; H04W 84/12; H04N 21/43637; H04N 21/2402; H04N 21/6375; H04N 21/44209; H04N 19/187;
(Continued)

(56) References Cited

U.S. PATENT DOCUMENTS

2003/0009717 A1* 1/2003 Fukushima ........... H04L 1/1642
714/748
2015/0312158 A1* 10/2015 Honary .................. H04L 47/10
370/235

(Continued)

*Primary Examiner* — Guerrier Merant
(74) *Attorney, Agent, or Firm* — Pearl Cohen Zedek Latzer Baratz LLP (57) ABSTRACT

A device, system and method are provided for wirelessly transmitting a sequence of video packets containing video data for one or more video frames. An importance metric associated with a priority of transmitting each individual packet in the sequence of video packets is independently computed, a retry limit or packet lifetime for each individual video packet in the sequence of video packets is independently determined based on the importance metric, and each video packet in the sequence of video packets is attempted to be transmitted. If the transmission attempt for an individual video packet in the sequence fails, the transmission attempt is repeated for up to the retry limit or the packet lifetime independently determined for the individual packet or until a successful transmission is achieved, whichever occurs first.

21 Claims, 6 Drawing Sheets (51) Int. Cl.
*H04L 29/06* (2006.01)
*H04N 21/4363* (2011.01)
*H04W 84/12* (2009.01)

(58) Field of Classification Search
CPC .... H04N 19/177; H04N 21/20; H04N 19/114; H04N 19/30
See application file for complete search history.

(56) References Cited

U.S. PATENT DOCUMENTS

2018/0331880 A1\* 11/2018 Wu ................... H04N 21/2402
2019/0089759 A1\* 3/2019 Yeh ..................... H04L 65/607

\* cited by examiner

FIG. 4 Illustration of Video GOPs

SYSTEM AND METHOD FOR IMPROVING EFFICIENCY OF WIRELESSLY TRANSMITTING VIDEO PACKETS

CROSS-REFERENCE TO RELATED APPLICATIONS

This application claims priority to Indian Patent Application No. 201841007160, filed Feb. 26, 2018, which is hereby incorporated by reference in its entirety.

FIELD OF THE INVENTION

Embodiments of the invention relate to the field of transmitting video data over wireless networks. Some embodiments of the invention relate to methods that can be implemented in a medium access control ("MAC") layer of a wireless local area network ("WLAN").

BACKGROUND OF THE INVENTION

Video applications, such as video streaming and interactive video applications, are very sensitive to packet loss and delay. Video data is commonly transmitted over wireless networks, e.g., using layer 2 technology, such as wireless local area networks ("WLAN"), due to advantages of wireless networks, such as ease and cost of deployment and maintenance. However, wireless networks are typically lossy networks that often drop video packets and degrade video playback performance.

Accordingly, there is a need in the art to improve the transmission of video data over wireless networks.

SUMMARY OF THE INVENTION

According to some embodiments of the present invention, there is provided a method and device for improving the transmission of video data over wireless networks. In an embodiment, a sequence of video packets is wirelessly transmitted containing video data for one or more video frames. An importance metric associated with a priority of transmitting each individual packet in the sequence of video packets may be independently computed, a retry limit or packet lifetime for each individual video packet in the sequence of video packets may be independently determined based on the importance metric, and each video packet in the sequence of video packets may be attempted to be transmitted. If the transmission attempt for an individual video packet in the sequence fails, the transmission attempt may be repeated for up to the retry limit or the packet lifetime independently determined for the individual packet or until a successful transmission is achieved, whichever occurs first.

The retry limit or packet lifetime of the video packets may be dynamically adjusted in real-time. The retry limit or packet lifetime of the video packets may be independently determined to be directly proportional to the importance metric of each video packet.

The importance metric of the video packet may be computed based on one or more factors selected from the group consisting of: a video frame type, an order of a frame fragment, and a success or failure streak of the sequence of video packets. The importance metric of the video packet may be computed based on the video frame type of the video packet, and a video packet associated with an I video frame has a higher importance metric than a video packet associated with a P frame, which in turn has a higher importance metric than a video packet associated with a B frames.

The importance metric of the video packet may be computed based on the order of the frame fragment, such that a packet associated with a subsequent (Nth) frame fragment is assigned a relatively greater importance metric than a prior (N−1th) frame fragment. A separate value of the order of the frame fragment for each different video frame type may be maintained.

The importance metric of the video packet may be proportional to a streak value counting the number of successful transmissions of a group of the video packets associated with each I frame. The streak value may be incremented each time one of the group of video packets is successfully transmitted, or decremented each time one of the group of video packets is not successfully transmitted.

A separate streak value for each different video frame type may be maintained. An I frame streak counter may be initialized at the start of a new streaming session and incremented upon each successful I frame video packet transmission. A P frame streak counter may be initialized for each new group of frames associated with a new I frame and incremented upon each successful P frame video packet transmission. A B frame streak counter may be initialized for each new group of frames associated with a new I frame and incremented upon each successful B frame video packet transmission.

BRIEF DESCRIPTION OF THE DRAWINGS

The foregoing and other objects, features, and advantages of the present invention, as well as the invention itself, is more fully understood from the following description of various embodiments, when read together with the accompanying drawings.

DETAILED DESCRIPTION OF THE INVENTION

Embodiments of the present invention improve the performance of video applications implemented over lossy networks, by reconfiguring a common medium access control ("MAC") layer of a WLAN video streaming system to efficiently determine whether to drop one or more packets to reduce congestion while ensuring smooth video playback.

The 802.11 standard specifies a MAC layer, which provides a variety of functions that support the operation of 802.11-based WLANs. In general, the MAC layer manages and maintains communications between 802.11 stations (radio network cards and access points) by coordinating access to a shared radio channel and utilizing protocols that enhance communications over a wireless medium. Often viewed as the "brains" of the network, the 802.11 MAC layer uses an 802.11 Physical (PHY) Layer, such as 802.11b or 802.11a, to perform the tasks of carrier sensing, transmission, and receiving of 802.11 frames.

The MAC layer is a sub-layer of the layer 2, and the layer 2 refers to a data link layer concerned with moving data across physical links in the network. The MAC layer handles the transmissions, retransmissions and dropping of frames based on channel characteristics/parameters, such as a maximum number of transmission (or retransmission) attempts allowed for a packet (referred to as a "retry limit") or a maximum amount of time allowed for transmitting (or retransmitting) a packet (referred to as a "packet lifetime"). The MAC layer may also monitor the relative priority/importance of individual video frames based on the amount of information in each video frame, dependency between the video frames, and differences with respect to preceding frames. The importance information generated by the MAC layer may be utilized in combination with the above channel characteristics/parameters to determine the relative importance of the video packets.

For example, when a wireless device queues a packet for transmission, the device operates over the MAC layer to request a transmission channel and, upon successful channel acquisition, uses the wireless MAC to transmit the packet. If the packet transmission is successful, the device proceeds to process a next packet in the transmission queue. However, if the packet transmission fails, e.g., as inferred by a missing acknowledgment from the device intended to receive the packet, then the device retransmits the packet using the MAC layer until the retry limit is reached and/or the amount of time for attempting retransmission has exceeded the packet lifetime, whichever occurs first.

In conventional methods and devices, retry limits and packet lifetimes are fixed. Conventional retry limits and packet lifetimes are statically configured for a system and are not updated/changed thereafter (e.g., during operation or transmission). Instead, conventional methods use a single retry limit/packet lifetime for all packets to be transmitted that are of same category (e.g., video, voice, data, etc.). For example, conventional methods may utilize a single constant packet lifetime of 500 ms for all packets. Because conventional systems use the same retry limits and packet lifetimes, all frames have the same probability of being dropped.

In contrast to conventional methods and systems of wireless transmission of video data, embodiments of the present invention dynamically adjust retry limits and packet lifetimes in real-time for each individual video packet proportionally to the packet's importance or priority (e.g., compared to other packets to be transmitted). By using packet-specific retry limits and packet lifetimes proportional to packet importance, embodiments of the present invention have a relatively lower probability of dropping higher priority frames compared to lower priority frames. By shifting more transmission resources to higher priority frames, such embodiments increase the overall transmission success rate of higher priority frames compared to conventional methods to improve the overall wireless video performance, allowing for smoother video playback. In addition, reducing the retry limits and packet lifetimes of lower priority frames may reduce wireless network congestion, and increase the overall transmission speed.

In some embodiments of the present invention, the longest duration packet lifetime utilized may be the same as (e.g., 500 ms) or shorter than (e.g., 200 ms) conventional packet lifetimes, while the shortest (and all other) duration packet lifetime utilized may be significantly smaller (e.g., 20 ms) than conventional packet lifetimes. Thus, the total amount of time to transmit a video utilizing embodiments of the present invention will take less time than a conventional method or device.

In some embodiments of the invention, relative importance of a packet may be based on a video frame type. For example, H.264 video encoders produce various types of video frames, such as "I frames," "P frames," and "B frames," that each carry different types of information. I frames typically carry more information than P frames, and P frames typically carry more information than B frames. More specifically, I frames are independent frames that generally contain the full information associated with an individual image frame. P frames are dependent on one or more previous (e.g., I) frames, generally defining a difference or delta in the associated image relative to the previous frames, which may result in greater compression than I-frames. B frames are dependent on one or more previous or forward frames and generally result in the highest amount of data compression.

In some embodiments of the invention, packets containing I frame data may be assigned a greater importance or priority value than packets containing P frame data, which may be assigned a greater importance value or priority than packets containing B frame data. I frames may be assigned a greater importance than P or B frames because a loss of an I frame may more significant degrade video quality than a loss of a P frame or a B frame, for example, because other video frames are not required to decode I frames (i.e., I frames carry full information and do not use information from other frames). In other words, I frames are more important than P frames and B frames because I frames are viewable by themselves. P frames may be assigned a greater importance than B frames because, in a lossy network, there is a twice as high a chance that a P frame will be decoded than a B frame because it is twice as likely that either one of the previous or forward frames of a B frame which are both necessary for decompressing the B frame could be lost, than the chance of losing only a previous frame used to decompress the P frame. As packets are assigned retry limits and packet lifetimes proportionally to their importance, I frame packets may be assigned greater retry limits and packet lifetimes than P frame packets, which in turn may be assigned greater retry limits and packet lifetimes than B frame packets. According to such embodiments fewer I frame packets (relative to P frame packets) and fewer P frame packets (relative to B frame packets) may be dropped, as compared to conventional systems which set the same retry limits and packet lifetimes for all I, P and B frames and thus drop all I, P and B frames with the same probability.

Thus, by adjusting retry limit and/or packet lifetime based on the type of video frame of the packet attempting to be transmitted, more time or attempts for transmission can be allowed for packets that have a higher chance of being decoded (i.e., require fewer other packets to decode the packet attempting to be transmitted) which results in smoother video playback and dropping of less frames.

Similarly, by adjusting retry limit and/or packet lifetime so that less time or attempts for transmission are allowed for packets that have a lower chance of being decoded (i.e., require more other packets to decode the packet attempting to be transmitted), the speed by which a device can transmit a video can be increased by reducing congestion.

Additionally or alternatively, the relative importance of the packet may be proportional to an order or number of a fragment of a frame. A subsequent (Nth) fragment of a frame may be assigned a higher importance value, and thus a proportionally higher retry limit and/or packet lifetime, as compared to a prior (N−1th) fragment of the frame. The later the subsequent fragment is transmitted, the more prior fragments have already been transmitted successfully, and thus the more there is to lose by the loss of a subsequent fragment. In contrast, for a first or prior fragment, there is no or less cost incurred for the frame so far, and its loss would result in less cumulative data lost. In various embodiments, there may be N relative importance values for each N fragments, M relative importance values for different groups of fragments, e.g., two relative importance values (a lower value for the first fragment and a higher value for the second or greater fragment(s)).

Additionally or alternatively, relative importance of a packet may be inversely proportional to a success streak value (or inversely proportional to a failure streak value) of the success (or failure) of transmitting a sequence of packets associated with one or more video frames. For example, if the streak value is greater than a predetermined positive threshold value, then the transmission of video frames has been relatively successful and a loss of a packet would be minimally harmful; whereas if the streak value is less than the predetermined value, then one or more recent frame transmissions have failed and therefore the current video frame transmission is given a higher importance value to compensate for the poor performance to maintain a predefined level of video quality.

For example, a streak counter can be initialized to zero. Each time a packet is successfully transmitted, the streak counter may be increased by one. Each time a packet is dropped, the streak counter may be decreased by 1. In some embodiments of the invention, a streak counter is maintained for each type of video frame (e.g., I, P, and B frames). A streak value for I frames may be continuously updated for every I frame (without resetting in between) because the I frames carry full information and do not use information from other frames. The streak value for P and B frames may be reset for every new I frame or Group of Pictures ("GOP") and updated thereafter because the P and B frames contain incremental information on top of the I frame which is transmitted at the beginning of every GOP. P and B frame streak counters may be reset each GOP because success/failure streaks from previous GOPs are of no significance to a current GOP as P and B frames only need to use adjacent packets for decoding.

In some embodiments of the invention, relative importance of the packet may be based on any combination of a video frame type, an order of a frame fragment, and a success/failure streak of packets for a video frame. The importance of a packet may be computed, for example, as a weighted sum of a combination of two or more of these factors. In one example, the video frame type factor may have a greater weight than the order of frame fragment factor, which in turn may have a greater weight than the success/failure streak factor, although other weights, hierarchies or orders of factor importance may be used.

Regarding the type of video frame a packet belongs to: I frames may be assigned the highest importance because I frames contain full information or picture (e.g., I frames do not require other video frames to decode), and losing I frames has a greater effect on video quality than losing P or B frames. P frames and B frames may be assigned less importance than I frames because P frames and B frames contain incremental information with respect to I and previous and future P and B frames. P frames may be assigned a higher importance than B frames because P frames are less reliant on the successful transmission of other frames than B frames because P frames use data from previous frames for decoding, whereas B frames use data from both previous and subsequent frames to decode.

Regarding an amount of a frame already transmitted, subsequent fragments of a frame ($2^{nd}$ onwards) may be given a higher weight compared to prior fragment of the frame during transmission, for example, because if one or more fragments of a frame are already transmitted successfully, then a part of the video frame is already at the receiver and, thus, it is important to transmit the remaining fragments (and portion) of the video frame so the receiver can reassemble the frame from the fragments, decode and play it. In contrast, before attempting to transmit a first fragment of a video frame, no other fragments of that video frame have been already transmitted, such that, if there is an indication of congestion, the whole frame could be discarded if the first fragment transmission fails.

Regarding success/failing streak, if the streak value is greater than a certain positive value, then the transmission of video frames belonging to that video frame type have been successful, and, therefore, the current video frame transmission may assume normal or reduced priority. If the streak value is smaller than a predetermined value, then recent frame transmissions have failed, and, therefore, the current video frame transmission may be given higher priority to maintain video quality.

The MAC layer may use the importance index to get the values for packet lifetime, retry limit, and any other parameters to be used for transmitting the packet. In some embodiments of the invention, the MAC layer may use an importance index table, for example, as follows:

| Video Frame Type | First/Subsequent fragment | Streak value | Packet Importance Index |
|---|---|---|---|
| I | Subsequent | <=5 | 0 |
| I | Subsequent | >5 | 1 |
| I | First | <=5 | 2 |
| I | First | >5 | 3 |
| P | Subsequent | <=2 | 4 |
| P | Subsequent | >2 | 5 |
| P | First | <=2 | 6 |
| P | First | >2 | 7 |
| B | Subsequent | <=4 | 8 |
| B | Subsequent | >4 | 9 |
| B | First | <=4 | 10 |
| B | First | >4 | 11 |

Packet Importance Index 0 may correspond to the highest importance, whereas Packet Importance Index 11 may correspond to the lowest importance.

Apart from video frame type, an order of a frame fragment, and a success/failure streak of packets for a video frame, any other importance information generated by an encoding layer could be used in combination with the above parameters to determine the relative importance of video packets.

In some embodiments of the invention, when the MAC layer takes up a video packet (fragment of a video frame) for transmission, the MAC layer can determine the importance index for the packet using the any combination of video frame type to which the packet belongs, whether it is the first fragment or the subsequent fragment of the frame; and the streak counter value for the video frame type. The MAC layer may determine the packet lifetime and retry limit using the importance index and configures and starts packet transmission.

Values chosen for packet lifetime and retry limits may also depend on the application. Packet lifetime values may depend on the playout delay and/or buffering that the video application can afford. For interactive applications like video conferencing, which cannot afford large delays and buffering, the packet lifetime value cannot be too large. In other words, packet lifetime value may be smaller for interactive applications than for applications that can handle larger delays and buffering, such as, non-interactive applications, like video streaming. For applications which cannot afford large delays and buffering, the maximum packet lifetime corresponding to a highest importance may not be bigger than e.g., approximately 200 ms. Otherwise, the delays and/or buffering may be visible to human eyes. Whereas for non-interactive applications, like video streaming, which can afford larger delays and buffering, the maximum packet lifetime value corresponding to a highest importance can be e.g., in a range of from approximately 200 ms to 500 ms. Packet lifetimes for other importance values may be derived from the maximum value linearly down to a minimum value of 20 ms, for example, such that one 1500 byte packet takes approximately 12 ms at 1 Mbps to allow at least one transmission attempt at the lowest possible WLAN rate.

Retry limit values may depend on power consumption and may also be used to limit the number of transmissions in the network to avoid network congestion. Retry limit values may be kept low for packets of low importance and high for packets of high importance because retransmissions affect network congestion negatively when there are many devices in the network, which in turn affects overall network performance. Transmissions also affect power consumption and, therefore, for battery powered devices, it is important to reduce transmissions. Thus, selecting retry limits based on packet importance may help reduce power consumption and overall network efficiency.

In some embodiments of the invention, the retry limit value for packets with the highest importance may be set e.g., to 24 retry attempts, before terminating, and the retry limit values for packets with lower importance may be derived from this maximum value linearly down to a minimum of e.g., 2 retry attempts, for lowest importance, as can be seen in the example table below.

| Importance index | Packet lifetime | Packet retry limit |
|---|---|---|
| 0 | 200 ms | 24 |
| 1 | 150 ms | 16 |
| 2 | 100 ms | 14 |
| 3 | 80 ms | 12 |
| 4 | 80 ms | 10 |

| Importance index | Packet lifetime | Packet retry limit |
|---|---|---|
| 5 | 70 ms | 8 |
| 6 | 60 ms | 6 |
| 7 | 50 ms | 4 |
| 8 | 50 ms | 4 |
| 9 | 40 ms | 2 |
| 10 | 30 ms | 2 |
| 11 | 20 ms | 2 |

When a packet exceeds either the packet lifetime or the retry limit, that packet may be discarded and, in some embodiments, the streak counter may be restarted.

In some embodiments of the invention, a default or minimum packet lifetime and/or retry limit value, such as e.g., 20 ms and/or 2 tries, may be utilized at the beginning of every packet transmission irrespective of the packet's importance, and may be increased for packets with relatively high or above threshold importance or priority values.

Multiple different tables mapping the importance index to packet transmission parameters, such as packet lifetime and retry limit, may be maintained and used. One of the tables could be used at any point in time based on certain criteria, such as MAC transmit rate and/or video packet queue backlog. The MAC transmit rate is the rate selected by the MAC layer, based on transmit statistics, for the transmission of packets. IEEE 802.11 bgn 1×1 supports 20 transmit rates ranging from 1 mbps to 65 mbps as shown below:

| Rate in mbps |
|---|
| 1  2  5.5  6  6.5  9  11  12  13  18  19.5  24  26  36  39  48  52  54  58.5  65 |

The current transmit rate reflects the throughput being achieved by the device affected by range, interference and congestion. The higher the transmit rate is, the higher the throughput is, and vice versa. Queue backlog directly reflects the throughput being achieved by the device in prevailing conditions. If the queue backlog is high, it indicates the throughput is low and packets may start getting dropped due to lack of memory for new packets sent by higher layers to MAC. In such conditions, instead of dropping packets at the source, it is advantageous to speed up transmission and recycling of packets at the other end.

An example of multiple different tables mapping the importance index to packet transmission parameters is shown for example as follows:

| | Table 1 | | Table 2 | | Table 3 | |
|---|---|---|---|---|---|---|
| Importance index | Packet lifetime (ms) | Packet retry limit | Packet lifetime (ms) | Packet retry limit | Packet lifetime (ms) | Packet retry limit |
| 0 | 200 | 24 | 100 | 12 | 50 | 6 |
| 1 | 150 | 16 | 75 | 8 | 37 | 4 |
| 2 | 100 | 14 | 50 | 7 | 25 | 3 |
| 3 | 80 | 12 | 40 | 6 | 20 | 3 |
| 4 | 80 | 10 | 40 | 5 | 20 | 2 |
| 5 | 70 | 8 | 35 | 4 | 17 | 2 |
| 6 | 60 | 6 | 30 | 3 | 15 | 1 |

-continued

| | Table 1 | | Table 2 | | Table 3 | |
|---|---|---|---|---|---|---|
| Importance index | Packet lifetime (ms) | Packet retry limit | Packet lifetime (ms) | Packet retry limit | Packet lifetime (ms) | Packet retry limit |
| 7 | 50 | 4 | 25 | 2 | 12 | 1 |
| 8 | 50 | 4 | 25 | 2 | 12 | 1 |
| 9 | 40 | 2 | 20 | 1 | 10 | 0 |
| 10 | 30 | 2 | 15 | 1 | 7 | 0 |
| 11 | 20 | 2 | 10 | 1 | 5 | 0 |

In some embodiments of the invention, a frame may be dropped without any attempt to transmit, if the lifetime is less than the packet duration or retry limit is zero.

Figure 1A:
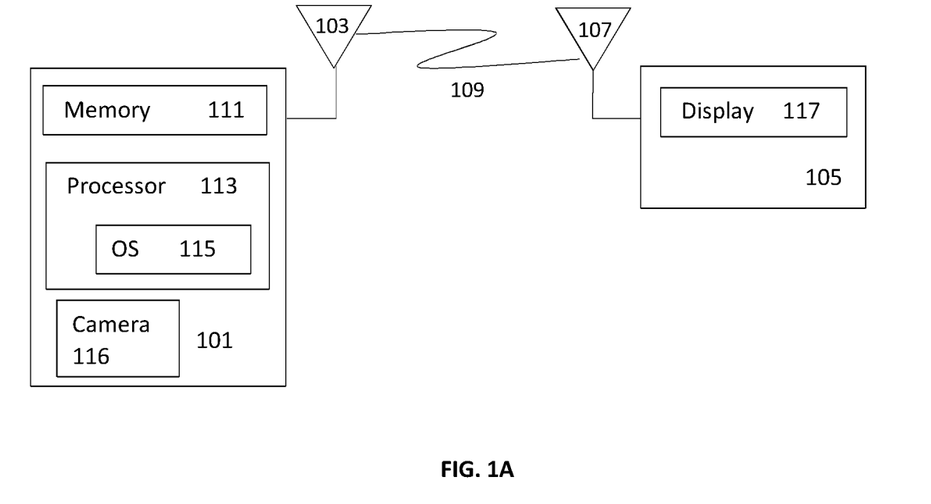
FIG. 1A schematically illustrates a system for wirelessly transmitting a sequence of video packets over a wireless local area network ("WLAN"), in an Access Point ("AP") mode, according to an embodiment of the invention.

Reference is made to FIG. 1A which schematically illustrates a system for wirelessly transmitting a sequence of video packets over a wireless local area network ("WLAN") with a device, in an Access Point ("AP") mode, according to an embodiment of the invention.

The system of FIG. 1A may include a transmitting device 101 which can transmit video packets 109 over a WLAN to a receiving device 105. The transmitting device 101 can be a video camera with a WLAN interface, a smartphone, a personal computer, desktop computer, mobile computer, laptop computer, and notebook computer, or any other suitable device such as a personal digital assistant (PDA), video game console, etc.

The transmitting device 101 can include an antenna or transceiver 103 for transmitting the video packets 109 to the receiving device 105. The transmitting device 101 can include a processor 113 which can execute software residing in an operating system ("OS") 115. The transmitting device 101 can include a memory 111. The memory 130 can include, for example, a read only memory ("ROM"), a random access memory ("RAM"), a dynamic RAM ("DRAM"), a flash memory, a volatile memory, a non-volatile memory, a cache memory, a buffer, or other suitable permanent, long-term or short-term memory units or storage units. The transmitting device 101 can include a camera 116 or be in communication with an external camera.

In some embodiments of the invention, the processor 113 may be configured to compute an importance metric associated with a priority of transmitting each individual packet of the one or more video frames transmitted by the transmitting device 101. The processor 113 may be configured to determine a retry limit and/or packet lifetime for each individual video packet in the sequence of video packets 109 based on the importance metric associated with the priority of transmitting the individual video packet 109. The processor 113 may be configured to attempt to transmit each video packet in the sequence of video packets via transceiver 103. The processor 113 may be configured to, upon receiving a message indicating that the transmission attempt for an individual video packet 109 in the sequence failed, repeat attempting to transmit the individual video packets 109 for up to the retry limit or packet lifetime determined for the individual video packet 109 or until a successful transmission is achieved.

In some embodiments of the invention, the processor 113 is configured to dynamically adjust the retry limit or packet lifetimes in real time. The processor 113 can be configured to independently determine the retry limit or packet lifetimes to be directly proportional to the importance metric of each video packet 109. The processor 113 can be configured to compute the importance metric of the video packet 109 based on one or more of the following factors: a video frame type, an order of a frame fragment, and a success or failure streak of the sequence of video packets.

In some embodiments of the invention, the processor 113 is configured to compute the importance metric of the video packet based on the video frame type of the video packet 109, configured to assign a video packet 109 associated with an I video frame a higher importance metric than a video packet 109 associated with a P frame, and configured to assign a video packet 109 associated with a P frame a higher importance metric than a video packet associated with a B frame.

In some embodiments of the invention, the processor 113 may compute the importance metric of the video packet 109 based on the order of the frame fragment, such that a packet 109 associated with a subsequent (Nth) frame fragment is assigned a relatively greater importance metric than a prior (N−1th) frame fragment. The processor 113 can be configured to maintain, in the memory 111, a separate value of the order of the frame fragment for each different video frame type. The processor 113 can be configured to maintain a separate streak value, in the memory 130, for each different video frame type.

In some embodiments of the invention, the processor 113 may be configured such that the importance metric of the video packet 109 is proportional to a streak value counting the number of successful transmissions of a group of the video packets 109 associated with each I frame, wherein the streak value is incremented each time one of the group of video packets 109 is successfully transmitted to receiving device 105, or decremented each time one of the group of video packets 109 is not successfully transmitted to receiving device 105.

In some embodiments of the invention, the processor 113 can be configured to initialize an I frame streak counter at the start of a new streaming session; initialize a P frame streak counter for each new group of frames associated with a new I frame; initialize a B frame streak counter for each new group of frames associated with a new I frame; increment the I frame streak counter upon each successful I frame video packet transmission; increment the P frame streak counter upon each successful P frame video packet transmission; and increment the B frame streak counter upon each successful B frame video packet transmission.

The receiving device 105 can be a smartphone, a personal computer, desktop computer, mobile computer, laptop computer, and notebook computer, or any other suitable device such as a personal digital assistant (PDA), video game console, etc.) The receiving device 105 may include an antenna or transceiver 107 for receiving the video packets 109 transmitted by the transmitting device 101. The receiving device 105 may include or be in communication with a display 117 for viewing the video once the necessary video packets 109 have been received by the receiving device 105.

Figure 1B:
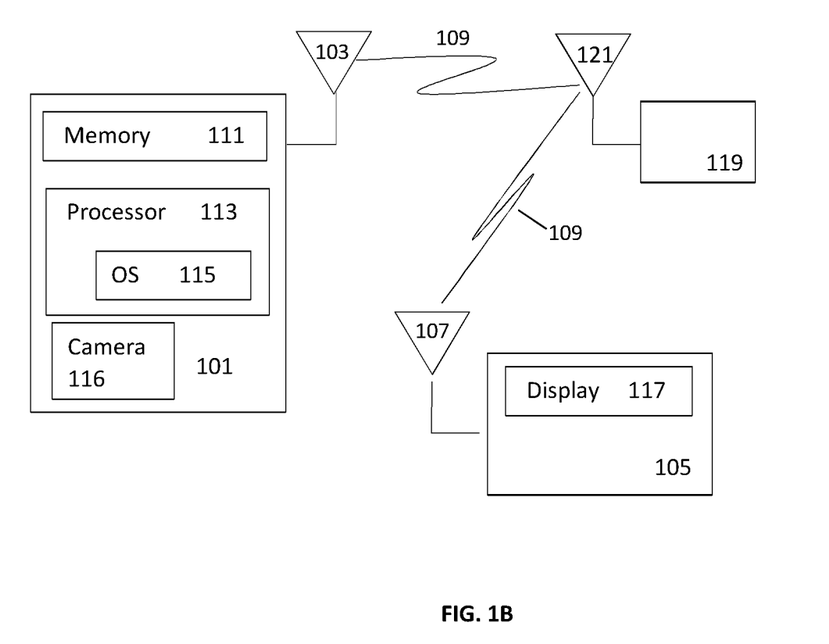
FIG. 1B schematically illustrates a system for wirelessly transmitting a sequence of video packets over a wireless local area network ("WLAN"), in a Station ("STA") mode, according to an embodiment of the invention.

Reference is made to FIG. 1B which schematically illustrates a system for wirelessly transmitting a sequence of video packets over a wireless local area network ("WLAN") with a video camera device, in a Station ("STA") mode, according to an embodiment of the invention.

The system of FIG. 1B may include the transmitting device 101 which can transmit video packets 109 over a WLAN to a WLAN Access Point 119 which in turn can transmit the video packets 109 over the WLAN to the receiving device 105. The WLAN Access Point 119 may include an antenna or transceiver 121 for receiving the video packets 109 transmitted by transmitting device 101, and for transmitting the video packets 109 to the receiving device 105.

Figure 2:
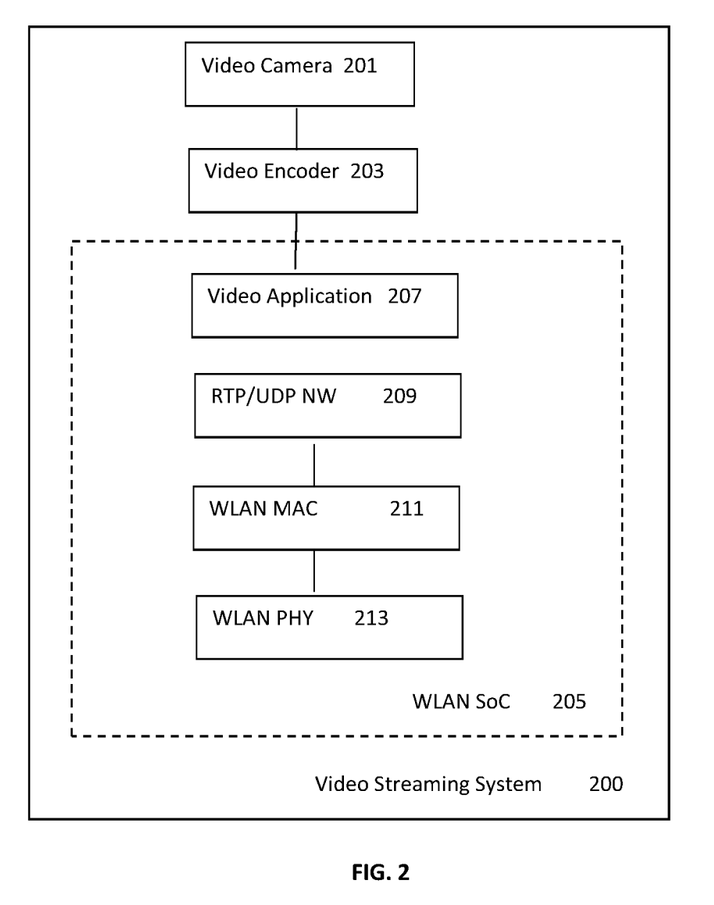
FIG. 2 schematically illustrates a video streaming system, according to an embodiment of the invention.

Reference is made to FIG. 2 which schematically illustrates a video streaming system 200, according to an embodiment of the invention.

The video streaming system 200 can include a video camera 201 (e.g., camera 116 of FIGS. 1A and 1B), a video encoder 203, and a WLAN System-on-a-chip ("WLAN SoC") device 205 (e.g., processor 113 of FIGS. 1A and 1B). The video encoder 203 can be configured to encode image(s), audio, and/or videos captured by video camera 201, and transmit the encoded data to the WLAN SoC 205.

The WLAN SoC 205 can include a video application 207, a Real-time Transport Protocol/User Datagram Protocol Network ("RTP/UDP NW") 209, WLAN MAC layer protocol 211, and a WLAN Physical Layer or medium ("WLAN PHY") 213.

The RTP/UDP 209 may be a network protocol for delivering audio and video over the network. The format of the MAC frames can be specified in the WLAN MAC layer protocol. The WLAN PHY 213 can interface a physical medium with the MAC and upper layers.

Figure 3:
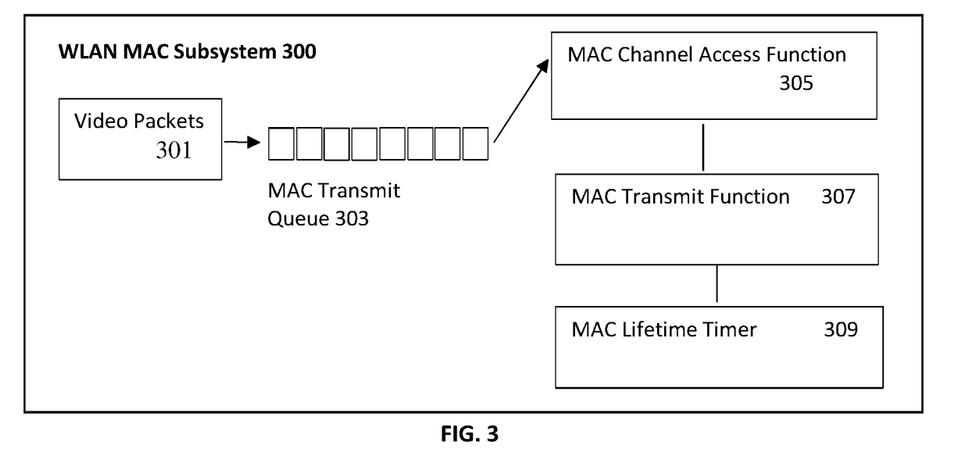
FIG. 3 schematically illustrates a WLAN MAC subsystem, according to an embodiment of the invention.

Reference is made to FIG. 3 which schematically illustrates a WLAN MAC subsystem 300, according to an embodiment of the invention.

The WLAN MAC subsystem 300 (e.g., the WLAN MAC 211 of FIG. 2) can include video packets 301 (e.g., video packets 109 of FIGS. 1A and 1B), a MAC transmit queue 303, a MAC Channel Access Function 305, a MAC Transmit Function 307, and a MAC Lifetime Timer 309.

The MAC Channel Access Function 304 can be configured to connect to a channel, and, upon successful channel acquisition, the MAC Transmit Function 307 is configured to transmit the packet 301. If the packet transmission is successful, the WLAN MAC subsystem 300 is configured to move on to a next packet. The MAC Transmit Function 307 can be configured to, if transmission of the packet 301 fails, e.g., as inferred by a missing acknowledgement from a receiver (e.g., the receiving device 105 of FIGS. 1A and 1B), retransmit the packet 301. The MAC Transmit Function 307 can be configured to continue to retransmit the failed packet 301 until the MAC Lifetime Timer 309 detects that the retry limit is reached or the packet 301 exceeds its lifetime, whichever occurs first. If the retry limit is reached or the packet 301 exceeds its lifetime, the packet is dropped and no further attempt is made to transmit the packet.

Figure 4:
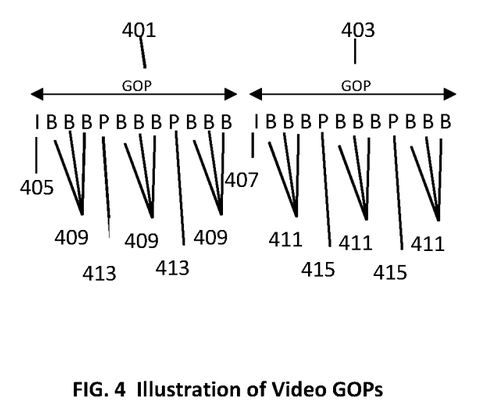
FIG. 4 illustrates an exemplary frame type breakdown of two groups of pictures ("GOP"), according to an embodiment of the invention.

Reference is made to FIG. 4 which illustrates an example of a frame type breakdown of two groups of pictures ("GOP"), according to an embodiment of the invention.

The first GOP 401 may start with an I frame 405 followed by a plurality of B frames 409 and P frames 413. The second GOP 403 may start with an I frame 407 followed by a plurality of B frames 411 and P frames 415.

Figure 5:
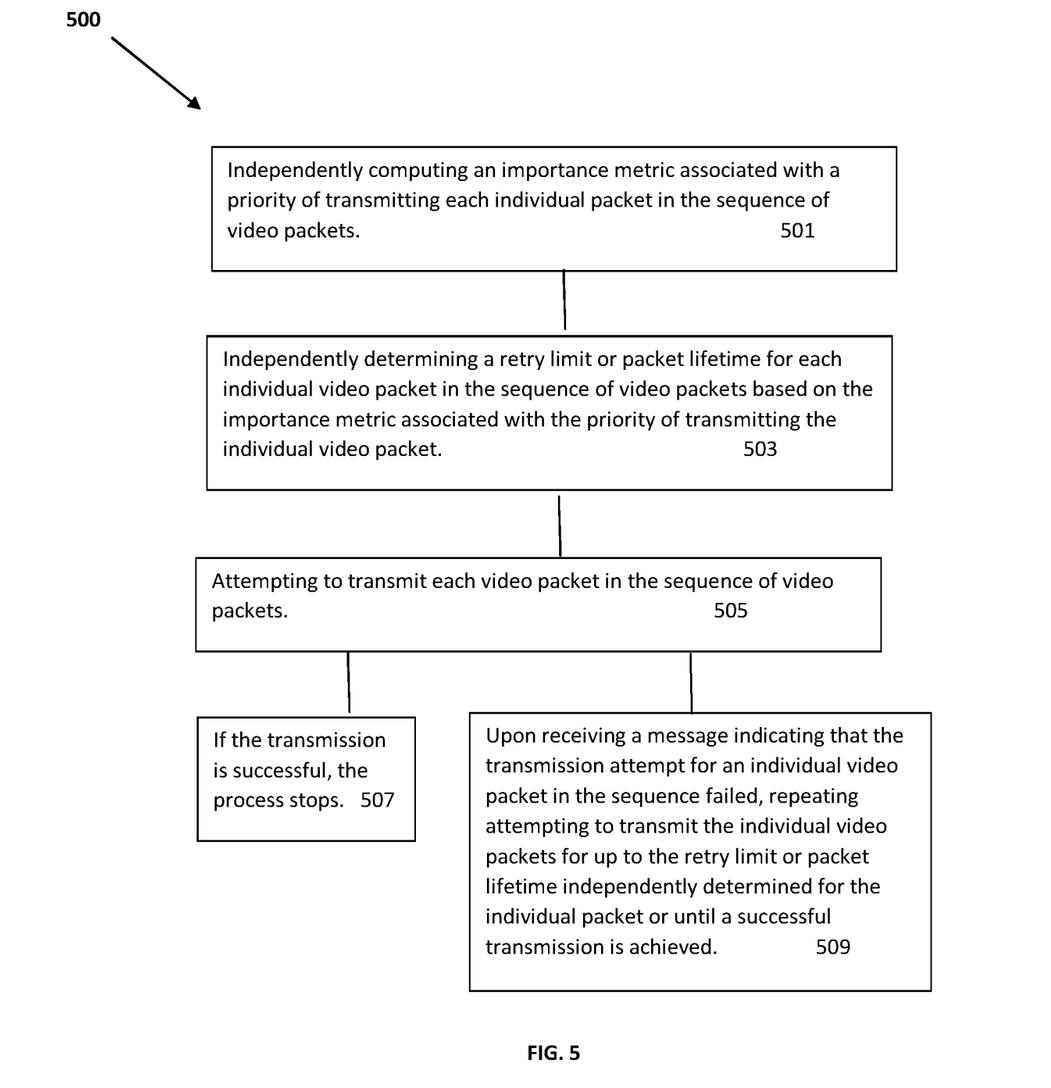
FIG. 5 is a flowchart of a method for wirelessly transmitting a sequence of video packets containing video data for one or more video frames, according to an embodiment of the invention.

Reference is made to FIG. 5 which illustrates a flowchart of a method 500 for wirelessly transmitting a sequence of video packets containing video data for one or more video frames, according to an embodiment of the invention.

In operation 501, a processor (e.g., processor 113 of FIGS. 1A and 1B) may independently compute an importance metric associated with a priority of transmitting each individual packet in the sequence of video packets.

In operation 503, the processor may independently determine a retry limit or packet lifetime for each individual video packet in the sequence of video packets based on the importance metric associated with the priority of transmitting the individual video packet, such that at least a plurality of packets have different retry limits or packet lifetimes. In some embodiments of the invention, the processor is configured to dynamically adjust the retry limit or packet lifetimes in real time. The processor may determine the retry limit or packet lifetime such that the retry limit or packet lifetime is directly proportional to the importance metric of each video packet.

In some embodiments of the invention, the processor may compute the importance metric of the video packet based on the video frame type of the video packet, and a video packet associated with an I video frame has a higher importance metric than a video packet associated with a P frame, which in turn has a higher importance metric than a video packet associated with a B frames.

In some embodiments of the invention, the processor may compute the importance metric of the video packet based on the order of the frame fragment, such that a packet associated with a subsequent (Nth) frame fragment is assigned a relatively greater importance metric than a prior (N−1th) frame fragment. The processor may maintain a separate value of the order of the frame fragment in a memory (e.g., memory 111 of FIGS. 1A and 1B) for each different video frame type.

In some embodiments of the invention, the importance metric of the video packet may be computed based on a streak value that is proportional to the number of successful transmissions of a group of the video packets associated with each I frame, wherein the streak value is incremented each time one of the group of video packets is successfully transmitted, and/or decremented each time one of the group of video packets is not successfully transmitted. The processor may maintain a separate streak value in the memory for each different video frame type, or a combined streak value for all frame types.

In some embodiments of the invention, the processor may initialize an I frame streak counter at the start of a new streaming session; initialize a P frame streak counter for each new group of frames associated with a new I frame; initialize a B frame streak counter for each new group of frames associated with a new I frame; increment the I frame streak counter upon each successful I frame video packet transmission; increment the P frame streak counter upon each successful P frame video packet transmission; and increment the B frame streak counter upon each successful B frame video packet transmission.

In operation 505, the processor may attempt to transmit each video packet in the sequence of video packets, via a transceiver (e.g., the transceiver 103 of FIGS. 1A and 1B).

If the transmission is successful, the transmission process for the video packet stops at operation 507. However, if the processor receives a message indicating that the transmission attempt for the video packet in the sequence failed, or does not receive a message indicating that the transmission attempt for the video packet has succeeded, in operation 509, the processor may repeat attempting to transmit the individual video packet for up to the number of tries or packet lifetime independently determined for the individual packet or until a successful transmission is achieved.

Figure 6:
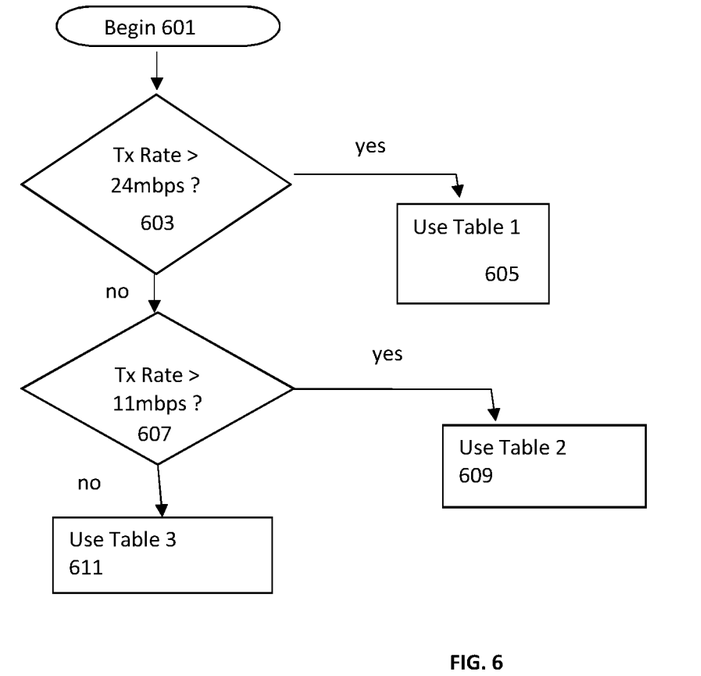
FIG. 6 is a flowchart of a method for selecting a parameter table using transmission rate, according to an embodiment of the invention.

Reference is made to FIG. 6 which is a flowchart of a method for selecting one of a plurality of parameter tables based on a transmission rate, according to an embodiment of the invention.

The method begins in operation 601. In operation 603, a processor (e.g., the processor 113 from FIGS. 1A and 1B) determines if the transmission rate is greater than a first predetermined threshold, e.g., 24 mb/s. If the transmission rate is greater than the first predetermined threshold in operation 603, then, in operation 605, the processor uses Table 1, shown below, to determine the packet lifetimes and retry limits:

|  | Table 1 | | Table 2 | | Table 3 | |
|---|---|---|---|---|---|---|
| Importance index | Packet lifetime (ms) | Packet retry limit | Packet lifetime (ms) | Packet retry limit | Packet lifetime (ms) | Packet retry limit |
| 0 | 200 | 24 | 100 | 12 | 50 | 6 |
| 1 | 150 | 16 | 75 | 8 | 37 | 4 |
| 2 | 100 | 14 | 50 | 7 | 25 | 3 |
| 3 | 80 | 12 | 40 | 6 | 20 | 3 |
| 4 | 80 | 10 | 40 | 5 | 20 | 2 |
| 5 | 70 | 8 | 35 | 4 | 17 | 2 |
| 6 | 60 | 6 | 30 | 3 | 15 | 1 |
| 7 | 50 | 4 | 25 | 2 | 12 | 1 |
| 8 | 50 | 4 | 25 | 2 | 12 | 1 |
| 9 | 40 | 2 | 20 | 1 | 10 | 0 |
| 10 | 30 | 2 | 15 | 1 | 7 | 0 |
| 11 | 20 | 2 | 10 | 1 | 5 | 0 |

If, in operation 603, the processor determines that the transmission rate is not greater than the first predetermined threshold, then, in operation 607 the processor determines if the transmission rate is greater than a second predetermined threshold, e.g., 11 mb/s. If the transmission rate is greater than the second predetermined threshold, then, in operation 609, the processor uses the above Table 2 to determine the packet lifetimes and retry limits. If, in operation 607, the processor determines that the transmission rate is not greater than the second predetermined threshold, then, in operation 611, the processor uses the above Table 3 to determine the packet lifetimes and retry limits. This process may continue for any number of N predetermined thresholds and associated tables.

In some embodiments, the multiple tables are provided to set the packet lifetimes and retry limits to values scaled or proportional to the transmission rates of the system. Lower transmission rates may use more channel time to complete a transmission than higher transmission rates; however, lower transmission rates are typically more reliable (e.g., may require less retries) than higher transmission rates to complete the transmission). As explained above, the higher the transmit rate is, the higher the throughput is, and vice versa. When the transmission rate/throughput is low, in such conditions, instead of dropping packets at the source, it is advantageous to speed up transmission and recycling of packets at the other end. Thus, in some embodiments of the invention, a table for a lower transmission rate may have smaller packet lifetimes and/or packet retry limits for each importance index than a table for a larger transmission rate.

Figure 7:
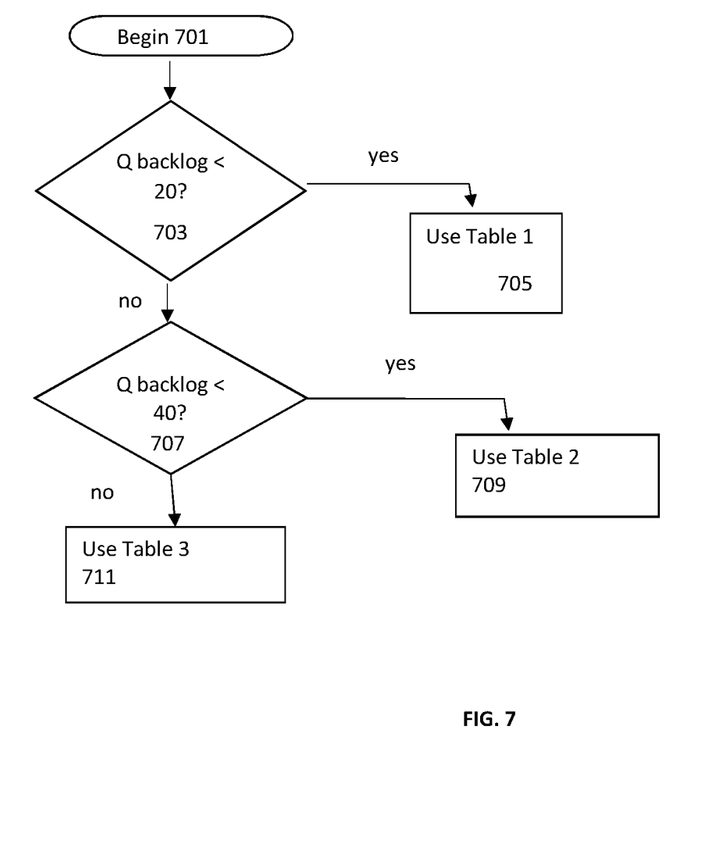
FIG. 7 is a flowchart of a method for selecting a parameter table using queue backlog, according to an embodiment of the invention.

Reference is made to FIG. 7 which is a flowchart of a method for selecting one of a plurality of parameter tables based on a queue backlog, according to an embodiment of the invention The method begins in operation 701. In operation 703, a processor (e.g., the processor 113 from FIGS. 1A and 1B) determines if the queue backlog is less than a first predetermined number, e.g., 20. If the queue backlog is less than the first predetermined number in operation 703, then, in operation 705, the processor uses Table 1, shown below, to determine the packet lifetimes and retry limits:

|  | Table 1 | | Table 2 | | Table 3 | |
|---|---|---|---|---|---|---|
| Importance index | Packet lifetime (ms) | Packet retry limit | Packet lifetime (ms) | Packet retry limit | Packet lifetime (ms) | Packet retry limit |
| 0 | 200 | 24 | 100 | 12 | 50 | 6 |
| 1 | 150 | 16 | 75 | 8 | 37 | 4 |
| 2 | 100 | 14 | 50 | 7 | 25 | 3 |
| 3 | 80 | 12 | 40 | 6 | 20 | 3 |
| 4 | 80 | 10 | 40 | 5 | 20 | 2 |
| 5 | 70 | 8 | 35 | 4 | 17 | 2 |
| 6 | 60 | 6 | 30 | 3 | 15 | 1 |
| 7 | 50 | 4 | 25 | 2 | 12 | 1 |
| 8 | 50 | 4 | 25 | 2 | 12 | 1 |
| 9 | 40 | 2 | 20 | 1 | 10 | 0 |
| 10 | 30 | 2 | 15 | 1 | 7 | 0 |
| 11 | 20 | 2 | 10 | 1 | 5 | 0 |

If, in operation 703, the processor determines that the queue backlog is not less than the first predetermined number, then, in operation 707 the processor determines if the queue backlog is less than a second predetermined number. If the queue backlog is less than the second predetermined number, then, in operation 709, the processor uses the above Table 2 to determine the packet lifetimes and retry limits. If, in operation 707, the processor determines that the queue is not less than the second predetermined number, then, in operation 711, the processor uses the above Table 3 to determine the packet lifetimes and retry limits.

In some embodiments, the multiple tables are provided in FIG. 7 to set the packet lifetimes and retry limit to values scaled or inversely proportional to the transmission queue backlog of the system. As explained above, a relatively high queue backlog may indicate that the throughput is relatively low and packets may start getting dropped due to lack of memory for new packets sent by higher layers to MAC. In such conditions, instead of dropping packets at the source, it is advantageous to speed up transmission and recycling of packets at the other end. Thus, in some embodiments of the invention, a table for a larger queue backlog may have smaller packet lifetimes and/or packet retry limits for each importance index than a table for a smaller queue backlog.

Example Analysis of Video Performance Improvement

An example video encoder (e.g., 203 of FIG. 2) may generate a 1 mbps video stream. An RTP layer may packetize the video stream into 1400 byte video packets. The packet rate is therefore approximately 90 packets/sec input into the MAC layer for transmission, which is approximately one packet every 11 ms. The following packet sequence may be used composed of 14 packets belonging to one GOP and corresponding importance index derived based on above scheme.

Example

Video Packet

Because I frames are typically larger (contain more information) than B frames and P frame, the above example depicts an example of a single I frame broken down into 3 packets I1, I2, and I3 to meet Real-time Transport Protocol ("RTP") packet size requirements. Because P and B frames are typically smaller than I frames, P and/or B frames may be fragmented into one or more than one packet (depending on the frame and packet sizes) to meet RTP packet size requirements.

The following tables show the packet lifetime and retry limits applied for this sequence of packets with various transmit parameter tables. Table A is generated without applying the above scheme, and Tables B-D define packet lifetime and retry limit data for the above Table 1, Table 2, and Table 3, respectively.

TABLE A without applying the above scheme

| Packet | Importance Index | Packet Lifetime | Retry Limit |
|---|---|---|---|
| I1 | 0 | 200 | 8 |
| I2 | 0 | 200 | 8 |
| I3 | 0 | 200 | 8 |
| B | 0 | 200 | 8 |
| B | 0 | 200 | 8 |
| B | 0 | 200 | 8 |
| P | 0 | 200 | 8 |
| B | 0 | 200 | 8 |
| B | 0 | 200 | 8 |
| B | 0 | 200 | 8 |
| P | 0 | 200 | 8 |
| B | 0 | 200 | 8 |
| B | 0 | 200 | 8 |
| B | 0 | 200 | 8 |
| Aggregate | | 2,800 | 112 |

TABLE B based on Table 1

| Packet | Importance Index | Packet Lifetime | Retry Limit |
|---|---|---|---|
| I1 | 2 | 100 | 14 |
| I2 | 0 | 200 | 24 |
| I3 | 0 | 200 | 24 |
| B | 10 | 30 | 2 |
| B | 10 | 30 | 2 |
| B | 10 | 30 | 2 |
| P | 6 | 60 | 6 |
| B | 10 | 30 | 2 |
| B | 10 | 30 | 2 |
| B | 11 | 20 | 2 |
| P | 6 | 60 | 6 |
| B | 11 | 20 | 2 |
| B | 11 | 20 | 2 |
| B | 11 | 20 | 2 |
| Aggregate | 0 | 850 | 92 |

TABLE C based on Table 2

| Packet | Importance Index | Packet Lifetime | Retry Limit |
|---|---|---|---|
| I1 | 2 | 50 | 7 |
| I2 | 0 | 100 | 12 |
| I3 | 0 | 100 | 12 |
| B | 10 | 15 | 1 |
| B | 10 | 15 | 1 |
| B | 10 | 15 | 1 |
| P | 6 | 30 | 3 |

TABLE C-continued based on Table 2

| Packet | Importance Index | Packet Lifetime | Retry Limit |
|---|---|---|---|
| B | 10 | 15 | 1 |
| B | 10 | 15 | 1 |
| B | 11 | 10 | 1 |
| P | 6 | 30 | 3 |
| B | 11 | 10 | 1 |
| B | 11 | 10 | 1 |
| B | 11 | 10 | 1 |
| Aggregate | 0 | 425 | 46 |

TABLE D based Table 3

| Packet | Importance Index | Packet Lifetime | Retry Limit |
|---|---|---|---|
| I1 | 2 | 25 | 3 |
| I2 | 0 | 50 | 6 |
| I3 | 0 | 50 | 6 |
| B | 10 | 7 | 0 |
| B | 10 | 7 | 0 |
| B | 10 | 7 | 0 |
| P | 6 | 15 | 1 |
| B | 10 | 7 | 0 |
| B | 10 | 7 | 0 |
| B | 11 | 5 | 0 |
| P | 6 | 15 | 1 |
| B | 11 | 5 | 0 |
| B | 11 | 5 | 0 |
| B | 11 | 5 | 0 |
| Aggregate | 0 | 210 | 17 |

In a "worst-case" scenario, conventional fixed values for packet lifetime and retry limit may be, for example, 2800 ms and 112. Although this worst-case may not be hit, packet lifetime and retry limit could still be high in the presence of poor transmission performance, resulting in high delay and packet loss, irrespective of importance of packet. Whereas, according to embodiments of the invention, packet lifetime and retry limit are configured dynamically to adjust to operating conditions and avoid delay and loss for important packets.

In the foregoing description, various aspects of the present invention are described. For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method of wirelessly transmitting a sequence of video packets containing video data for one or more video frames, the method comprising:
    independently computing an importance metric associated with a priority of transmitting each individual packet in the sequence of video packets;
    independently determining a packet lifetime for each individual video packet in the sequence of video packets based on the importance metric associated with the priority of transmitting the individual video packet, wherein the packet lifetime is a maximum duration of time allowed for multiple repeat transmissions of the individual video packet;
    attempting to transmit each video packet in the sequence of video packets; and
    upon receiving a message indicating that the transmission attempt for an individual video packet in the sequence failed, repeating attempting to transmit the individual video packets:
        for up to the packet lifetime independently determined for the individual packet, or
        until a successful transmission is achieved before the packet lifetime has been reached.

2. The method of claim 1, wherein the packet lifetime of the video packets is dynamically adjusted in real-time.

3. The method of claim 1, wherein the packet lifetime of the video packets are independently determined to be directly proportional to the importance metric of each video packet.

4. The method of claim 1, wherein the importance metric of the video packet is computed based on one or more factors selected from the group consisting of: a video frame type, an order of a frame fragment, and a success or failure streak of the sequence of video packets.

5. The method of claim 4, wherein the importance metric of the video packet is computed based on the video frame type of the video packet, and a video packet associated with an I video frame has a higher importance metric than a video packet associated with a P frame, which in turn has a higher importance metric than a video packet associated with a B frames.

6. The method of claim 4, wherein the importance metric of the video packet is computed based on the order of the frame fragment, such that a packet associated with a subsequent (Nth) frame fragment is assigned a relatively greater importance metric than a prior (N−1th) frame fragment.

7. The method of claim 6 comprising maintaining a separate value of the order of the frame fragment for each different video frame type.

8. The method of claim 4, wherein the importance metric of the video packet is proportional to a streak value counting the number of successful transmissions of a group of the video packets associated with each I frame, wherein the streak value is incremented each time one of the group of video packets is successfully transmitted, or decremented each time one of the group of video packets is not successfully transmitted.

9. The method of claim 8 comprising maintaining a separate streak value for each different video frame type.

10. The method of claim 9, comprising:
    initializing an I frame streak counter at a start of a new streaming session;
    initializing a P frame streak counter for each new group of frames associated with a new I frame;
    initializing a B frame streak counter for each new group of frames associated with the new I frame;
    incrementing the I frame streak counter upon each successful I frame video packet transmission;
    incrementing the P frame streak counter upon each successful P frame video packet transmission; and
    incrementing the B frame streak counter upon each successful B frame video packet transmission.

11. The device of claim 8, wherein the processor is configured to maintain a separate streak value for each different video frame type.

12. The device of claim 11, wherein the processor is configured to:
    initialize an I frame streak counter at a start of a new streaming session;
    initialize a P frame streak counter for each new group of frames associated with a new I frame;
    initialize a B frame streak counter for each new group of frames associated with the new I frame;
    increment the I frame streak counter upon each successful I frame video packet transmission;
    increment the P frame streak counter upon each successful P frame video packet transmission; and
    increment the B frame streak counter upon each successful B frame video packet transmission.

13. The method of claim 1, wherein the packet lifetimes are independently determined to be proportional to the importance metric for each video packet.

14. A device for wirelessly transmitting a sequence of video packets containing video data for one or more video frames, the device comprising:
    a processor configured to:
        independently compute an importance metric associated with a priority of transmitting each individual packet in the sequence of video packets,
        independently determine a packet lifetime for each individual video packet in the sequence of video packets based on the importance metric associated with the priority of transmitting the individual video packet, wherein the packet lifetime is a maximum duration of time allowed for multiple repeat transmissions of the individual video packet,
        attempt to transmit each video packet in the sequence of video packets, and
        upon receiving a message indicating that the transmission attempt for an individual video packet in the sequence failed, repeat attempting to transmit the individual video packets:
            for up to the packet lifetime independently determined for the individual packet, or
            until a successful transmission is achieved before the packet lifetime has been reached.

15. The device of claim 14, wherein the processor is configured to dynamically adjust the packet lifetime of the video packets in real-time.

16. The device of claim 14, wherein the processor is configured to determine the packet lifetime of the video packets to be directly proportional to the importance metric of each video packet.

17. The device of claim 14, wherein the processor is configured to compute the importance metric of the video packet based on one or more factors selected from the group consisting of: a video frame type, an order of a frame fragment, and a success or failure streak of the sequence of video packets.

18. The device of claim 17, wherein the processor is configured to compute the importance metric of the video packet based on the video frame type of the video packet, and a video packet associated with an I video frame has a higher importance metric than a video packet associated with a P frame, which in turn has a higher importance metric than a video packet associated with a B frames.

19. The device of claim 17, wherein the processor is configured to compute the importance metric of the video packet based on the order of the frame fragment, such that a packet associated with a subsequent (Nth) frame fragment is assigned a relatively greater importance metric than a prior (N−1th) frame fragment.

20. The device of claim 19, comprising a memory, wherein the processor is configured to maintain a separate value of the order of the frame fragment for each different video frame type in the memory.

21. The device of claim 17, comprising a memory, wherein the processor is configured to:
- determine the importance metric of the video packet to be proportional to a streak value counting the number of successful transmissions of a group of the video packets associated with each I frame;
- store the streak value in the memory, and
- increment the streak value each time one of the group of video packets is successfully transmitted, or decremented each time one of the group of video packets is not successfully transmitted.

* * * * *